US012379688B2

(12) United States Patent
Takagi et al.

(10) Patent No.: US 12,379,688 B2
(45) Date of Patent: Aug. 5, 2025

(54) DEVELOPING CARTRIDGE

(71) Applicant: BROTHER KOGYO KABUSHIKI KAISHA, Nagoya (JP)

(72) Inventors: Takeyuki Takagi, Nagoya (JP); Hiroki Mori, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/631,304

(22) Filed: Apr. 10, 2024

(65) Prior Publication Data

US 2024/0345535 A1 Oct. 17, 2024

Related U.S. Application Data

(63) Continuation of application No. 17/937,052, filed on Sep. 30, 2022, now Pat. No. 11,988,988, which is a (Continued)

(30) Foreign Application Priority Data

Dec. 25, 2009 (JP) ................................ 2009-294594

(51) Int. Cl.
*G03G 15/04* (2006.01)
*G03G 15/06* (2006.01)
(Continued)

(52) U.S. Cl.
CPC ....... *G03G 21/1676* (2013.01); *G03G 15/065* (2013.01); *G03G 15/0865* (2013.01);
(Continued)

(58) Field of Classification Search
CPC ......................... G03G 15/065; G03G 15/0865
(Continued)

(56) References Cited

U.S. PATENT DOCUMENTS 6,311,026 B1 10/2001 Higeta et al.
6,804,475 B2 10/2004 Oguma et al.
(Continued)

FOREIGN PATENT DOCUMENTS

CN 1892485 A 1/2007
CN 101211154 A 7/2008
(Continued)

OTHER PUBLICATIONS

European Patent Office, Extended European Search Report for European Patent Application No. 10015969.8 (counterpart to parent U.S. Appl. No. 12/976,830, filed Dec. 22, 2010), dated Mar. 21, 2001.
(Continued)

*Primary Examiner* — Hoan H Tran
(74) *Attorney, Agent, or Firm* — Merchant & Gould P.C.

(57) ABSTRACT

A developing cartridge may include a housing configured to hold toner. The cartridge may further include a developing roller including a developing roller shaft, a supply roller including a supply roller shaft, a developing electrode and a supply electrode. The developing electrode and supply electrode may be configured to guide an electrical contact of an image forming apparatus in one or more directions. In some examples, the developing electrode and supply electrode may have angled surfaces that extend toward one another.

19 Claims, 8 Drawing Sheets

Related U.S. Application Data continuation of application No. 17/217,633, filed on Mar. 30, 2021, now Pat. No. 11,460,801, which is a continuation of application No. 16/733,931, filed on Jan. 3, 2020, now Pat. No. 10,983,476, which is a continuation of application No. 16/363,005, filed on Mar. 25, 2019, now Pat. No. 10,558,163, which is a continuation of application No. 15/846,276, filed on Dec. 19, 2017, now Pat. No. 10,261,465, which is a continuation of application No. 15/401,602, filed on Jan. 9, 2017, now Pat. No. 9,851,689, which is a continuation of application No. 14/992,553, filed on Jan. 11, 2016, now Pat. No. 9,568,856, which is a continuation of application No. 14/529,756, filed on Oct. 31, 2014, now Pat. No. 9,268,295, which is a continuation of application No. 14/045,929, filed on Oct. 4, 2013, now Pat. No. 9,037,032, which is a continuation of application No. 12/976,830, filed on Dec. 22, 2010, now Pat. No. 8,577,244.

(51) Int. Cl.
*G03G 15/08* (2006.01)
*G03G 21/16* (2006.01)

(52) U.S. Cl.
CPC ..... *G03G 15/0867* (2013.01); *G03G 15/0896* (2013.01); *G03G 21/1647* (2013.01); *G03G 21/1652* (2013.01)

(58) Field of Classification Search
USPC .......................................................... 399/119
See application file for complete search history.

(56) References Cited

U.S. PATENT DOCUMENTS

| | | | |
|---|---|---|---|
| 7,248,817 B2 | 7/2007 | Kishi et al. | |
| 7,444,087 B2 | 10/2008 | Ishii | |
| 7,450,876 B2 * | 11/2008 | Ishii | G03G 15/065 399/90 |
| 7,463,850 B2 | 12/2008 | Itabashi | |
| 7,526,228 B2 | 4/2009 | Shiraki | |
| 7,613,414 B2 | 11/2009 | Kamimura | |
| 7,643,770 B2 | 1/2010 | Sato et al. | |
| 7,689,139 B2 | 3/2010 | Kamimura | |
| 7,693,442 B2 | 4/2010 | Sato et al. | |
| 7,693,443 B2 | 4/2010 | Sato et al. | |
| 7,761,023 B2 | 7/2010 | Sato | |
| 7,761,025 B2 | 7/2010 | Sato | |
| 7,813,666 B2 | 10/2010 | Sato | |
| 7,813,677 B2 | 10/2010 | Itabashi | |
| 7,899,358 B2 | 3/2011 | Ishikawa | |
| 7,945,184 B2 | 5/2011 | Takagi | |
| 7,978,997 B2 | 7/2011 | Tokuda | |
| 8,155,552 B2 | 4/2012 | Kamimura | |
| 8,213,828 B2 | 7/2012 | Murayama et al. | |
| 8,538,291 B2 | 9/2013 | Mori | |
| 8,577,244 B2 | 11/2013 | Takagi et al. | |
| 10,558,163 B2 | 2/2020 | Takagi et al. | |
| 11,460,801 B2 | 10/2022 | Takagi et al. | |
| 2004/0009004 A1 | 1/2004 | Mizoguchi | |
| 2004/0028424 A1 | 2/2004 | Yokoi | |
| 2005/0047814 A1 | 3/2005 | Kawai | |
| 2007/0009281 A1 | 1/2007 | Sato et al. | |
| 2007/0009282 A1 | 1/2007 | Sato et al. | |
| 2007/0071481 A1 | 3/2007 | Kamimura | |
| 2008/0159773 A1 | 7/2008 | Murayama et al. | |
| 2008/0298838 A1 | 12/2008 | Sato et al. | |
| 2009/0074451 A1 | 3/2009 | Itabashi | |
| 2012/0177403 A1 | 7/2012 | Murayama et al. | |

FOREIGN PATENT DOCUMENTS

| | | | |
|---|---|---|---|
| EP | 1939697 A1 | | 7/2008 |
| JP | H02-136264 U | | 11/1990 |
| JP | H09-197943 A | | 7/1997 |
| JP | H11-288169 A | | 10/1999 |
| JP | H11-305629 A | | 11/1999 |
| JP | 2004-037913 A | | 2/2004 |
| JP | 2005-070402 A | | 3/2005 |
| JP | 2007-058057 A | | 3/2007 |
| JP | 2007-102152 A | | 4/2007 |
| JP | 2007-114718 A | | 5/2007 |
| JP | 2008276273 | * | 11/2008 |
| JP | 2009162908 | * | 7/2009 |

OTHER PUBLICATIONS

Japan Patent Office, Notification of Reason for Refusal for Japanese Patnet Application No. 2009-294594 (counterpart to parent U.S. Appl. No. 12/976,830, filed Dec. 22, 2010), dated Oct. 18, 2011.
The State Intellectual Property Office of the People's Republic of China, Notification of the First Office Action for Chinese Patent Application No. 201010623065.3 (counterpart to parent U.S. Appl. No. 12/976,830, filed Dec. 22, 2010), issued May 8, 2012.
Jul. 22, 2015—U.S. Notice of Allowance—U.S. Appl. No. 14/621,622.
Aug. 7, 2015—U.S. Notice of Allowance—U.S. Appl. No. 14/621,632.
Aug. 14, 2015—U.S. Notice of Allowance—U.S. Appl. No. 14/621,657.
Sep. 1, 2015—U.S. Notice of Allowance—U.S. Appl. No. 14/621,674.
Feb. 23, 2016—(EP) Office Action—App 10015969.8.
Aug. 15, 2016—U.S. Non-Final Office Action—U.S. Appl. No. 15/056,266.
Notification of First Office Action with Search Report issued in related Chinese Patent Application No. 201510397647.7, Nov. 22, 2018.
Notification of First Office Action with Search Report issued in related Chinese Patent Application No. 201510397715.X, Nov. 29, 2018.
Notification of First Office Action with Search Report issued in related Chinese Patent Application No. 201510398219.6, Nov. 30, 2018.

* cited by examiner

DEVELOPING CARTRIDGE

CROSS-REFERENCE TO RELATED APPLICATIONS

This application is a continuation of U.S. patent application Ser. No. 17/937,052 which was filed on Sep. 30, 2022, which is a continuation of U.S. patent application Ser. No. 17/217,633, filed Mar. 30, 2021 and issued as U.S. Pat. No. 11,460,801 on Oct. 4, 2022, which is continuation of U.S. patent application Ser. No. 16/733,931 which was filed on Jan. 3, 2020 and issued as U.S. Pat. No. 10,983,476 on Apr. 20, 2021, which is a continuation application of U.S. patent application Ser. No. 16/363,005, which was filed on Mar. 25, 2019 and issued as U.S. Pat. No. 10,558,163 on Feb. 11, 2020, which is a continuation application of U.S. patent application Ser. No. 15/846,276, which was filed on Dec. 19, 2017 and issued as U.S. Pat. No. 10,261,465 on Apr. 16, 2019, which is a continuation application of U.S. patent application Ser. No. 15/401,602, which was filed on Jan. 9, 2017 and issued as U.S. Pat. No. 9,851,689 on Dec. 26, 2017, which is a continuation of U.S. patent application Ser. No. 14/992,553 which was filed on Jan. 11, 2016 and issued as U.S. Pat. No. 9,568,856 on Feb. 14, 2017, which is a continuation application of U.S. patent application Ser. No. 14/529,756, which was filed on Oct. 31, 2014 and issued on Feb. 23, 2016 as U.S. Pat. No. 9,268,295, which is a continuation application of U.S. patent application Ser. No. 14/045,929 which was filed on Oct. 4, 2013 and issued as U.S. Pat. No. 9,037,032 on May 19, 2015, which is a continuation of U.S. patent application Ser. No. 12/976,830, which was filed on Dec. 22, 2010 and issued as U.S. Pat. No. 8,577,244 on Nov. 5, 2013, which claims priority from Japanese Patent Application No. 2009-294594 filed on Dec. 25, 2009, the entire subject matter of each of which are incorporated herein by reference.

TECHNICAL FIELD

Apparatuses and devices consistent with the invention relates to a developing cartridge that is detachably mounted to a main body of an image forming apparatus.

BACKGROUND

In an image forming apparatus such as laser printers, there is known a developing cartridge that is detachably mounted to a main body of the apparatus.

The developing cartridge includes a developing roller and a supply roller that supplies toner to the developing roller. When the developing cartridge is mounted to the main body, the developing roller contacts a photosensitive drum that is provided in the main body. When forming an image, a bias having the same value is supplied to the developing roller and the supply roller, for example. When an electrostatic latent image formed on the photosensitive drum is opposed to the developing roller in accordance with rotation of the photosensitive drum, toner is supplied to the electrostatic latent image from the developing roller by a potential difference between the developing roller and the photosensitive drum. Thereby, the electrostatic latent image is developed as a toner image. Then, the toner image is transferred to a sheet, so that an image is formed on the sheet.

In order to improve an image quality, it is considered to individually set the bias that is supplied to the developing roller and the supply roller. In this case, it is required to provide electrodes individually to the developing roller and the supply roller and to configure them such that contact point members, which are provided to the main body in correspondence to the respective electrodes, contact the respective electrodes when the developing cartridge is mounted to the main body.

There has been proposed a related art developing cartridge in which electrodes are respectively provided to a developing roller and a supply roller, and a first contact point member and a second contact point member, which are electrically connected to a rotation shaft of the developing roller and a rotation shaft of the supply roller, respectively, are provided in a cover member that covers end portions of the developing roller and the supply roller. The first contact point member and the second contact point member are respectively extended toward positions away from the developing roller and the supply roller. Each leading end of the first and second contact point members is bent into a substantially U shape and is exposed as a contact point part (electrode) through each of openings that are arranged at the cover member in an upper-lower direction.

SUMMARY

However, the related-art developing cartridge does not consider making the developing cartridge (developing apparatus) thin. In the related-art developing cartridge, the cover member should have a predetermined thickness (dimension of a height direction) in order to arrange the respective contact point parts of the first and second contact point members.

Illustrative aspects of the invention provide a developing cartridge which is made to be thin while individually providing electrodes to a developing roller and a supply roller.

According to one illustrative aspect of the invention, there is provided a developing cartridge that can be detachably mounted to a main body of an image forming apparatus, the developing cartridge comprising: a housing including a developing chamber and a developer accommodating chamber that accommodates developer to be supplied to the developing chamber, wherein the developing chamber and the developer accommodating chamber are adjacent to each other; a developing roller, which is provided in the developing chamber, and which includes a developing roller shaft extending in a facing direction of both sidewalls of the housing; a supply roller, which is provided in the developing chamber, which includes a supply roller shaft extending in the facing direction of the both sidewalls of the housing, and which supplies the developer to the developing roller; a developing electrode, which is provided on an outer side of one sidewall of the housing, wherein the developing electrode is electrically connected to the developing roller shaft, and wherein the developing electrode includes a developing protrusion protruding in a direction parallel to the developing roller shaft at a position different from the developing roller shaft when seen from a side face; and a supply electrode, which is provided on the outer side of the one sidewall, wherein the supply electrode is electrically connected to the supply roller shaft, and wherein the supply electrode includes a supply protrusion protruding in a direction parallel to the supply roller shaft at a position different from the supply roller shaft when seen from the side face, and wherein the developing protrusion and the supply protrusion are arranged in an arrangement direction of the developing chamber and the developer accommodating chamber.

According to another illustrative aspect of the invention, there is provided a developing cartridge that is detachably mounted to a main body of an image forming apparatus, the developing cartridge comprising: a housing; a developing roller, which is provided in the housing, and which includes a developing roller shaft extending in a direction orthogonal to opposing sidewalls of the housing; a supply roller, which is provided in the housing, which includes a supply roller shaft extending in the direction orthogonal to the opposing sidewalls of the housing, and which supplies the developer to the developing roller; a developing electrode, which is provided on an outer side of one sidewall of the housing, wherein the developing electrode is electrically connected to the developing roller shaft, and wherein the developing electrode includes a developing protrusion protruding in a direction parallel to the developing roller shaft at a position different from the developing roller shaft when seen from a side face; and a supply electrode, which is provided on the outer side of the one sidewall, wherein the supply electrode is electrically connected to the supply roller shaft, and wherein the supply electrode includes a supply protrusion protruding in a direction parallel to the supply roller shaft at a position different from the supply roller shaft when seen from the side face, wherein the main body comprises: a developing contact point member that contacts the developing protrusion; and a supply contact point member that contacts the supply protrusion when the developing cartridge is mounted to the main body, and wherein a contact position between the developing contact point member and the developing protrusion is offset from a contact position between the supply contact point member and the supply protrusion in an arrangement direction of the developing roller shaft and the supply roller shaft.

According to still another illustrative aspect of the invention, there is provided a developing cartridge comprising: a housing comprising an upper wall, a bottom wall and a pair of opposing side walls connecting the upper wall and the bottom wall; a developing roller disposed between back end portions of the pair of opposing side walls, wherein the developing roller comprises a cylindrical developing roller main body and a developing roller shaft extending along a central axis of the developing roller main body, and wherein end portions of the developing roller shaft penetrate the side walls of the housing; a supply roller disposed between the opposing sidewalls of the housing at a position below and more toward a front side of the housing than the developing roller, wherein the supply roller comprises a cylindrical supply roller main body having a circumferential surface that contacts a circumferential surface of the developing roller main body, and wherein the supply roller also comprises a supply roller shaft that extends along a central axis of the supply roller main body and that penetrates the side walls of the housing; a developing electrode, which is electrically connected to the developing roller shaft, and which is disposed on an outer surface of one of the pair of opposing side walls of the housing at a position further toward the front side of the housing than a position where the developing roller shaft penetrates the one of the pair of opposing side walls, wherein the developing electrode comprises a developing protrusion, which is located at a position above and further toward the front side of the housing than the position where the developing roller shaft penetrates the one of the pair of side walls, wherein the developing protrusion protrudes from the one of the pair of side walls in a direction parallel to the developing roller shaft, and wherein the developing protrusion comprises: a parallel surface, which extends in a direction parallel to the front-back direction of the housing, a first inclined surface, which is inclined with respect to the parallel surface and which extends from a back most portion of the parallel surface; and a second inclined surface, which is inclined with respect to the parallel surface and which extends from a front most portion of the parallel surface; a supply electrode, which is electrically connected to the supply roller shaft, and which is disposed on the outer surface of the one of the pair of opposing side walls of the housing at a position further toward the front side of the housing than a position where the supply roller shaft penetrates the one of the pair of opposing side walls, wherein the supply electrode comprises a supply protrusion, which is located at a position above and further toward the front side of the housing than the position where the supply roller shaft penetrates the one of the pair of opposing side walls, wherein the supply protrusion protrudes from the one of the pair of side walls in a direction parallel to the supply roller shaft, and wherein the supply protrusion comprises: a parallel surface, which extends in a direction parallel to the front-back direction of the housing, a first inclined surface, which is inclined with respect to the parallel surface and which extends from a back most portion of the parallel surface, wherein the supply protrusion and the developing protrusion are arranged in sequence along the front to back direction of the housing.

According to the illustrative aspects of the invention, the housing of the developing cartridge includes therein the developing chamber and the developer accommodating chamber, which are formed adjacent to each other. The developer accommodating chamber accommodates developer and the developer is supplied to the developing chamber. The developing chamber includes the developing roller and the supply roller. The developing roller includes the developing roller shaft that extends in a facing direction of both sidewalls of the housing. In addition, the supply roller includes the supply roller shaft that extends in the facing direction of both sidewalls of the housing. The developing electrode, which is electrically connected to the developing roller shaft, and the supply electrode, which is electrically connected to the supply roller shaft, are provided at an outer face of one sidewall of the housing. The developing protrusion of the developing electrode protrudes in a direction parallel to the developing roller shaft at a position different from the developing roller shaft, when seen from a side face. The supply protrusion of the supply electrode is protruded at a position different from the supply roller in a direction parallel to the supply roller shaft, when seen from the side face. The developing protrusion and the supply protrusion are arranged in an arrangement direction, which extends in a front-back direction of the developing cartridge of the developing chamber and the developer accommodating chamber.

The developing protrusion is arranged at the position different from the developing roller shaft, and the supply protrusion is arranged at the position different from the supply roller shaft. Accordingly, it is possible to freely arrange the developing protrusion and the supply protrusion, irrespective of the arrangement of the developing roller shaft and the supply roller shaft. Therefore, it is possible to increase a degree of freedom of layouts of the developing protrusion and the supply protrusion.

The developing protrusion and the supply protrusion are arranged in the arrangement direction of the developing chamber and the developer accommodating chamber. Accordingly, even when a size in a thickness direction of the developing cartridge orthogonal to the arrangement direction is small, it is possible to arrange the developing protrusion and the supply protrusion. In other words, it is possible to make the developing cartridge thin by arranging the developing protrusion and the supply protrusion in the arrangement direction of the developing chamber and the developer accommodating chamber.

In addition, in order to feed power to the developing electrode through the developing protrusion, the main body includes the developing contact point member that is electrically connected to the developing protrusion. The developing protrusion is protruded in the direction parallel to the developing roller shaft. Accordingly, when connecting the developing contact point member to the developing protrusion, the developing contact point member does not scrape the sidewall of the developing cartridge. Hence, it is possible to prevent the sidewall of the developing cartridge and the developing contact point member from being worn.

Further, in order to feed power to the supply electrode through the supply protrusion, the main body includes the supply contact point member that is electrically connected to the supply protrusion. The supply protrusion is protruded in the direction parallel to the supply roller shaft. Accordingly, when connecting the supply contact point member to the supply protrusion, the supply contact point does not scrape the sidewall of the developing cartridge. Hence, it is possible to prevent the sidewall of the developing cartridge and the supply contact point member from being worn.

DETAILED DESCRIPTION

Hereinafter, an exemplary embodiment of the invention will be described in detail with reference to the drawings.

(1) Printer

Figure 1:
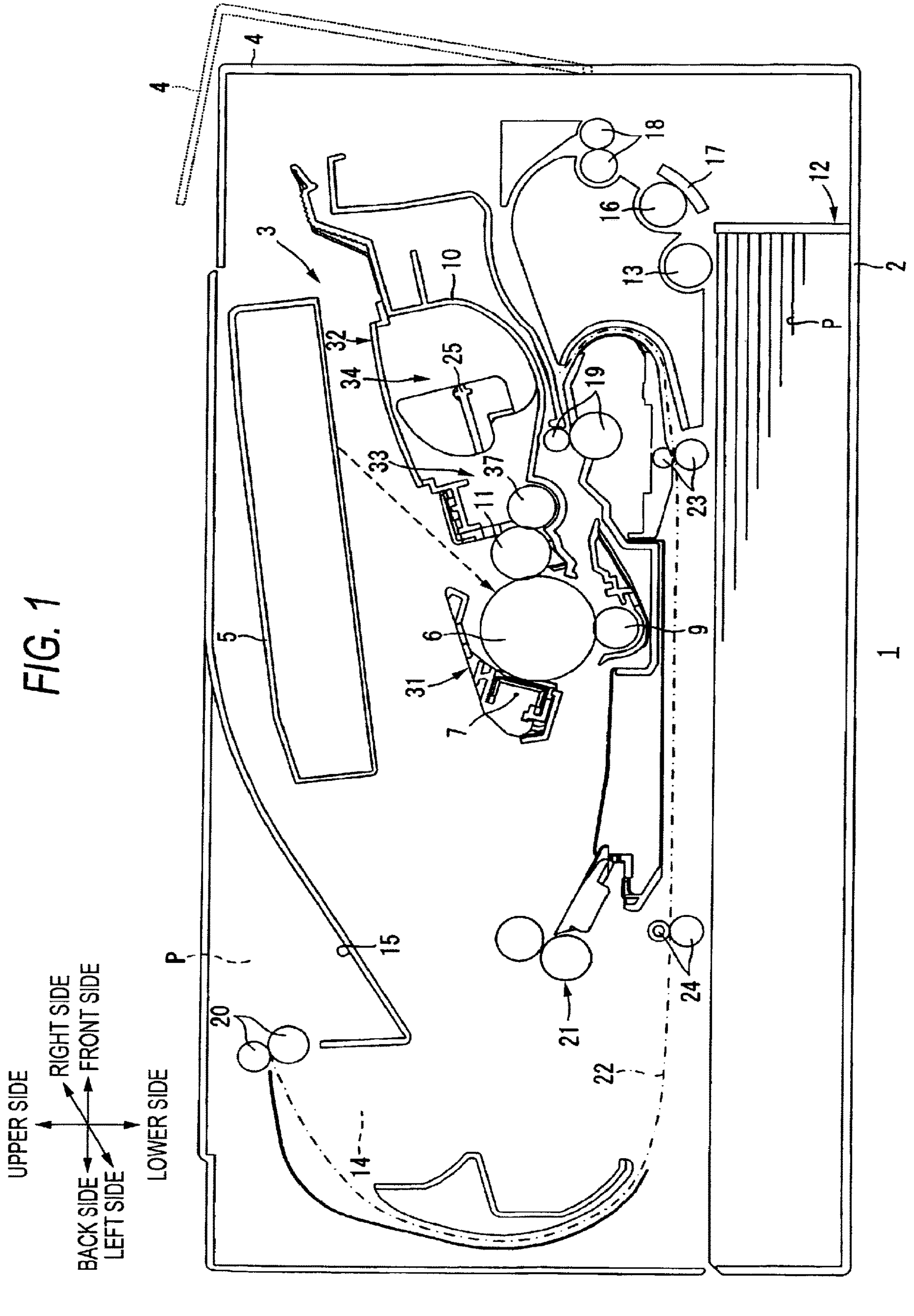
FIG. 1 is a side sectional view of a printer including a developing cartridge according to a first exemplary embodiment of the invention.

As shown in FIG. 1, a printer 1 (one example of an image forming apparatus) includes a body casing 2 (one example of a main body).

A process cartridge 3 is provided at a center portion in the body casing 2. The process cartridge 3 is detachably mounted to the body casing 2 via a front cover 4 that is provided at one sidewall of the body casing 2.

In the following descriptions, a side at which the front cover 4 is provided to the body casing 2 is referred to as the front side and a side opposite to the front side is referred to as the back side. In addition, the left and the right are assigned based on viewing the printer from the front side of the printer 1. Additionally, regarding a developing cartridge 32, which will be described later, the front, back, left and right are set based on the state in which the developing cartridge is mounted to the body casing 2.

The process cartridge 3 includes a drum cartridge 31 and a developing cartridge 32. The developing cartridge 32 is detachably mounted to the drum cartridge 31.

The drum cartridge 31 is provided with a rotatable photosensitive drum 6. The drum cartridge 31 includes a charger 7 and a transfer roller 9.

The photosensitive drum 6 is rotatable about an axis line extending in a direction perpendicular to a sheet face of FIG. 1.

The charger 7 is a scorotron-type charger and is arranged to be opposite to a circumferential surface of the photosensitive drum 6 with a predetermined interval provided between the charger 7 and the photosensitive drum.

The developing cartridge 32 includes a developing housing 10 (one example of the housing) that accommodates toner. In the developing housing 10, a developing chamber 33 and a toner accommodating chamber 34 (one example of a developer accommodating chamber), which accommodates toner supplied to the developing chamber 33, are provided adjacent to each other.

A developing roller 11 and a supply roller 37 are held in the developing chamber 33 such that the developing roller 11 and the supply roller 37 are rotatable with respect to the developing chamber 33.

The developing roller 11 has a circumferential surface, a part of which is exposed from a back end portion of the developing housing 10. In addition, the supply roller 37 has a circumferential surface that contacts a front side of the developing roller 11. The developing cartridge 32 is mounted to the drum cartridge 31 so that the part of the developing roller 11 exposed from the developing housing 10 contacts a circumferential surface of the photosensitive drum 6.

An agitator 25 is kept in the toner accommodating chamber 34 such that the agitator 25 is rotatable with respect to the toner accommodating chamber 34. Toner in the toner accommodating chamber 34 is supplied into the developing chamber 33 while being agitated by rotation of the agitator 25.

The transfer roller 9 is provided at a lower side of the photosensitive drum 6. The transfer roller 9 is rotatable about an axis line parallel to a rotation axis line of the photosensitive drum 6 and is arranged so that a circumferential surface of the transfer roller 9 contacts the circumferential surface of the photosensitive drum 6.

In the body casing 2, an exposure unit 5 that can emit laser and the like is arranged above the process cartridge 3.

When forming an image, the photosensitive drum 6 rotates at a constant speed in a clockwise direction in FIG. 1. In accordance with rotation of the photosensitive drum 6, the circumferential surface of the photosensitive drum 6 is uniformly charged by electric discharge from the charger 7. In the meantime, based on image data received from a personal computer (not shown) connected to the printer 1, a laser beam is emitted from the exposure unit 5. The laser beam passes between the charger 7 and the developing cartridge 32 and is irradiated on the circumferential surface of the photosensitive drum 6 that is positively charged to be uniform. Thereby, the circumferential surface of the photosensitive drum 6 is selectively exposed, and the electric charges are selectively removed from the exposed part, so that an electrostatic latent image is formed on the circumferential surface of the photosensitive drum 6. When the electrostatic latent image is opposed to the developing roller 11 by rotation of the photosensitive drum 6, toner is supplied to the electrostatic latent image from the developing roller 11. Thereby, a toner image is formed on the circumferential surface of the photosensitive drum 6.

A sheet feeding cassette 12 that stores sheets P is arranged at a bottom part of the body casing 2. A pickup roller 13 for sending the sheet from the sheet feeding tray 12 is provided above the sheet feeding cassette 12.

A conveyance path 14, which has an S shape when seen from the side face, is formed in the body casing 2. The conveyance path 14 reaches a sheet discharge tray 15 formed at an upper surface of the body casing 2 via a portion between the photosensitive drum 6 and the transfer roller 9 from the sheet feeding cassette 12. A separation roller 16 and a separation pad 17, which are arranged to be opposite to each other, a pair of feeder rollers 18, a pair of register rollers 19 and a pair of sheet discharge rollers 20 are provided on the conveyance path 14.

The sheets P are fed from the sheet feeding cassette 12 one at a time while passing between the separation roller 16 and the separation pad 17. Then, the sheet P is fed toward the register rollers 19 by the feeder rollers 18. Then, the sheet P is registered by the register rollers 19 and is conveyed toward a portion between the photosensitive drum 6 and the transfer roller 9 by the register rollers 19.

The toner image formed on the circumferential surface of the photosensitive drum 6 is electrically attracted and transferred onto the sheet P by the transfer roller 9 when the toner image is opposed to the sheet P passing between the photosensitive drum 6 and the transfer roller 9 by the rotation of the photosensitive drum 6.

On the conveyance path 14, a fixing unit 21 is provided at a downstream side of a conveyance direction of the sheet P from the transfer roller 9. The sheet P, on which the toner image is transferred, is conveyed through the conveyance path 14 and passes through the fixing unit 21. The fixing unit 21 fixes the toner image on the sheet P by heating and pressing so as to form an image on the sheet P.

As operation modes, the printer 1 includes a one-sided mode for forming an image (toner image) on one side of the sheet P and a duplex mode for forming an image on one side of the sheet P and then forming an image on the other side of the sheet P.

In the one-sided mode, the sheet P having an image formed on one side thereof is discharged to the sheet discharge tray 15 by the sheet discharge rollers 20.

As a structure for realizing the duplex mode, the body casing 2 is formed therein with a reverse conveyance path 22. The reverse conveyance path 22 extends between the conveyance path 14 and the sheet feeding cassette 12 from the vicinity of the sheet discharge rollers 20 and is connected to a part between the feeder rollers 18 and the register rollers 19 on the conveyance path 14. On the reverse conveyance path 22, a pair of first reverse conveying rollers 23 and a pair of second reverse conveying rollers 24 are provided.

In the duplex mode, the sheet P having an image formed on one side thereof is conveyed to the reverse conveyance path 22 rather than being discharged to the sheet discharge tray 15. Then, the sheet P is conveyed through the reverse conveyance path 22 by the first reverse conveying rollers 23 and the second reverse conveying rollers 24 and two sides thereof are reversed, so that the other side of the sheet P, on which no image is formed, is sent to the conveyance path 14 with being opposed to the circumferential surface of the photosensitive drum 6. Then, an image is formed on the other side of the sheet P, so that the images are formed on both sides of the sheet P.

(2) Developing Cartridge

The developing housing 10 of the developing cartridge 32 has a box shape having an opened back side.

Figure 2:
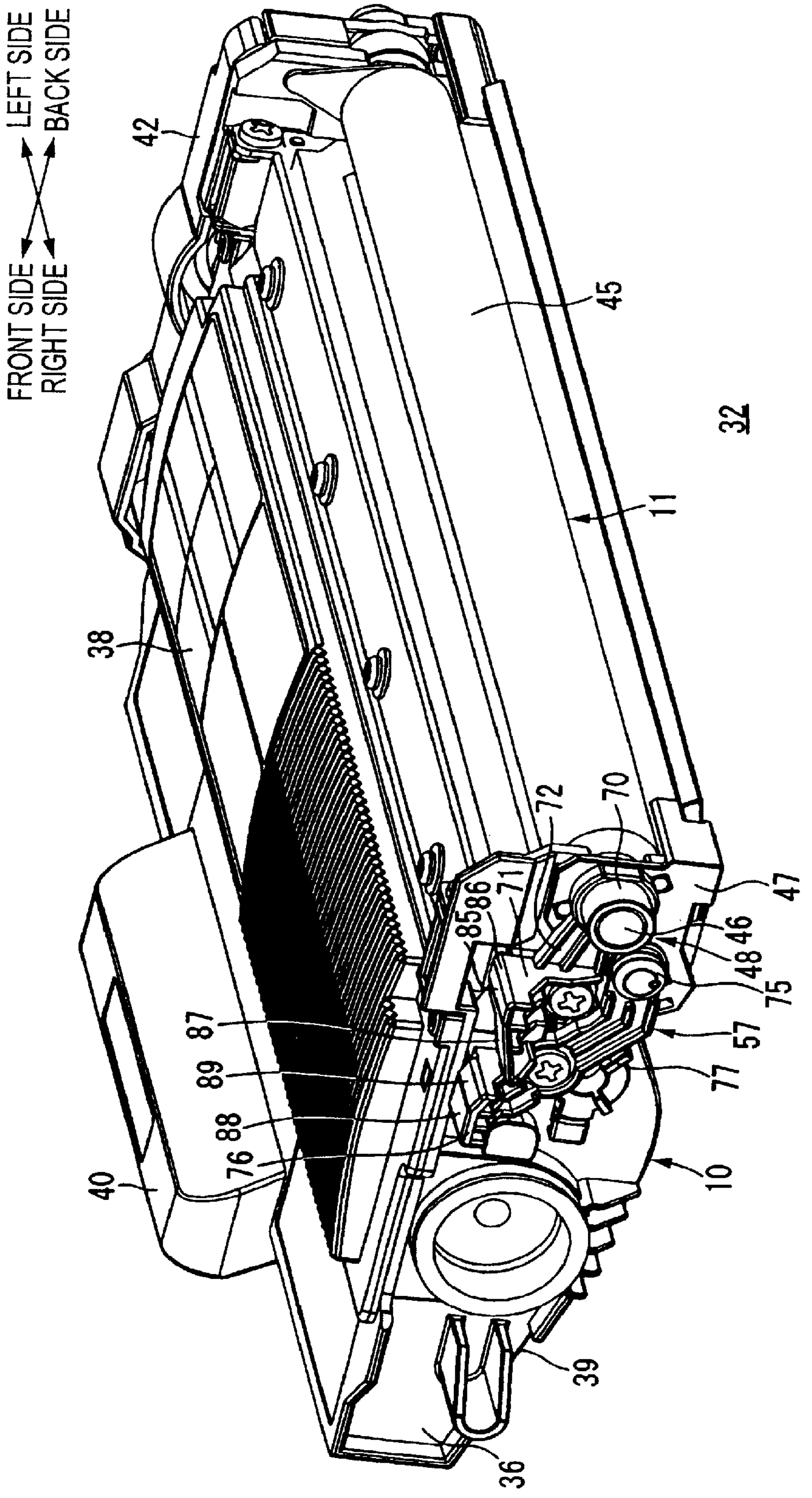
FIG. 2 is a perspective view of the developing cartridge according to the first exemplary embodiment.
Figure 3:
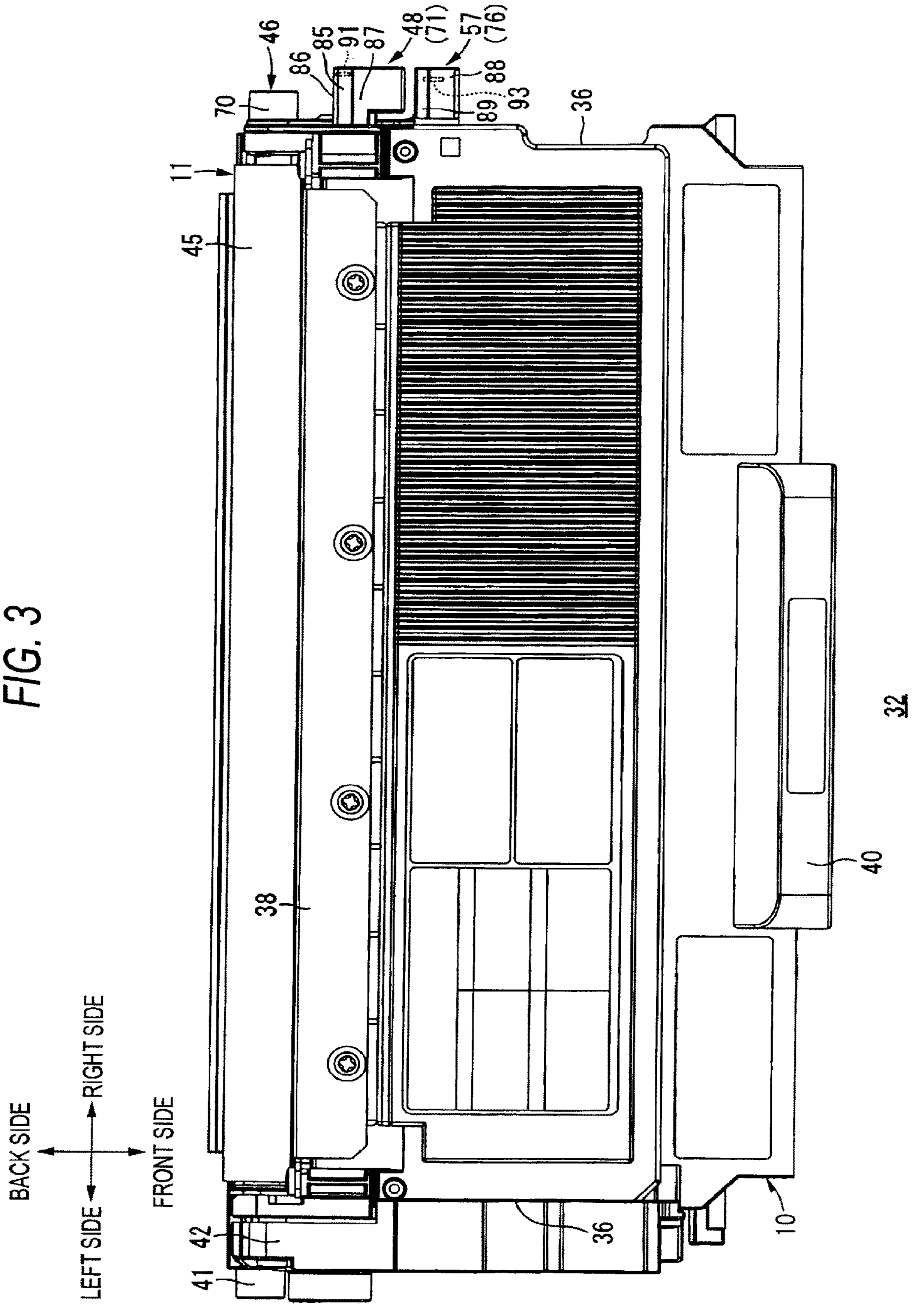
FIG. 3 is a plan view of the developing cartridge according to the first exemplary embodiment.

As shown in FIG. 3, the developing housing 10 includes a pair of sidewalls 36, which are opposed to each other in the left-right direction. As shown in FIGS. 2 and 3, an upper wall 38 and a bottom wall 39 are bridged between the sidewalls 36. The upper wall 38 and the bottom wall 39 are connected at a front end portion of the developing housing 10. The connected part includes a holding part 40. The holding part 40 is extended toward the front-upper direction from the front end portion of the developing housing 10 and has a sectional U shape having an opened front side.

The developing roller 11 and the supply roller 37 (refer to FIG. 1) are rotatably held between the sidewalls 36.

(2-1) Developing Roller

Figure 5:
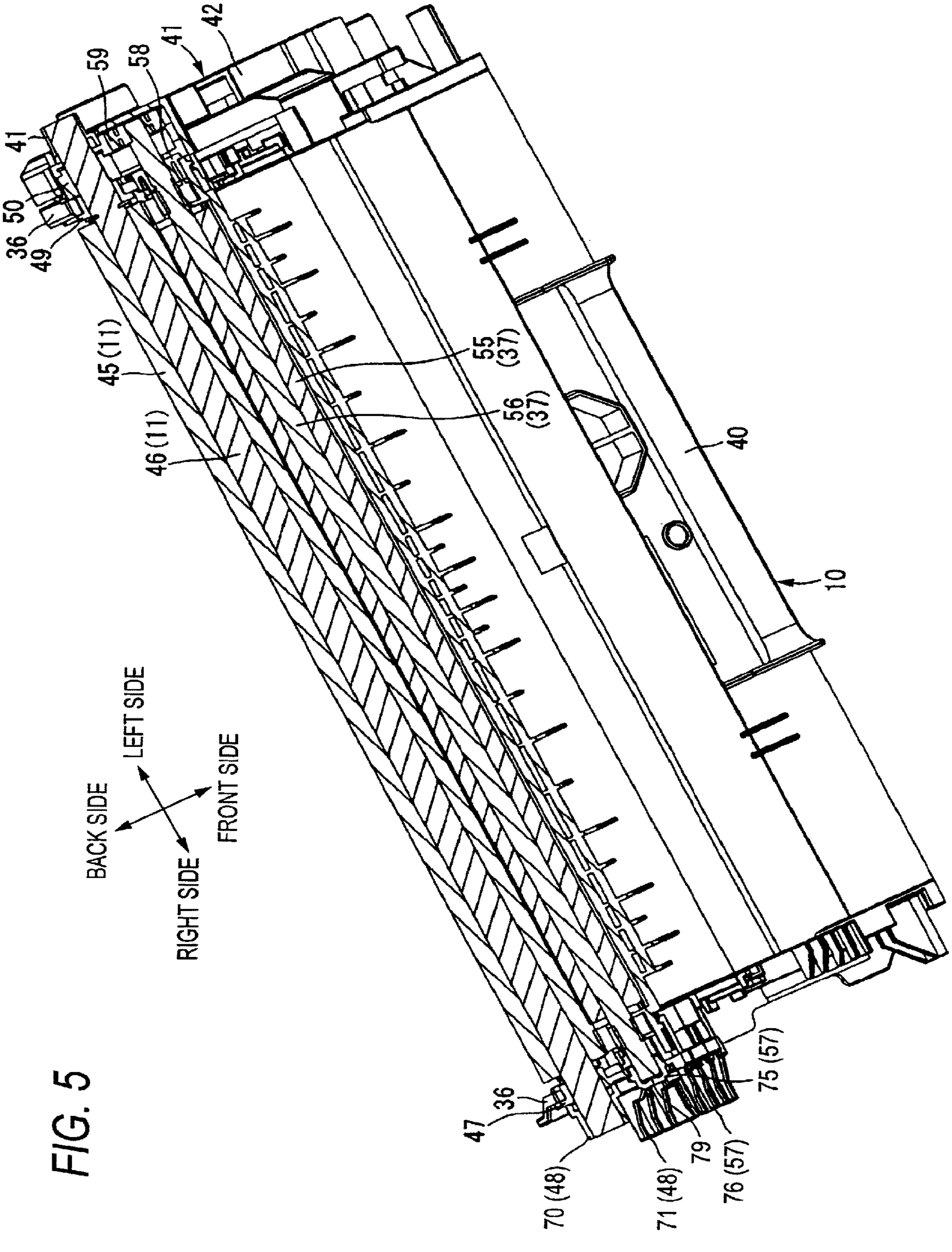
FIG. 5 is a sectional view of the developing cartridge according to the first exemplary embodiment taken along a line V-V of FIG. 4.

As shown in FIGS. 2 and 3, the developing roller 11 is arranged between back end portions of the sidewalls 36. As shown in FIG. 5, the developing roller 11 includes a cylindrical developing roller main body 45 extending in the left-right direction and a developing roller shaft 46 extending along a central axis line of the developing roller main body 45.

Both end portions of the developing roller shaft 46 penetrate the sidewalls 36 of the housing 10.

(2-2) Supply Roller

As shown in FIG. 1, the supply roller 37 is arranged at a position of the front-lower direction of the developing roller 11. As shown in FIG. 5, the supply roller 37 includes a cylindrical supply roller main body 55 extending in the left-right direction and a supply roller shaft 56 extending along a central axis line of the supply roller main body 55.

A circumferential surface of the supply roller main body 55 contacts a circumferential surface of the developing roller main body 45 from a front-lower part of the developing roller main body.

Both end portions of the supply roller shaft 56 penetrate the sidewalls 36 of the developing housing 10.

(2-3) Bearing Member

Figure 4:
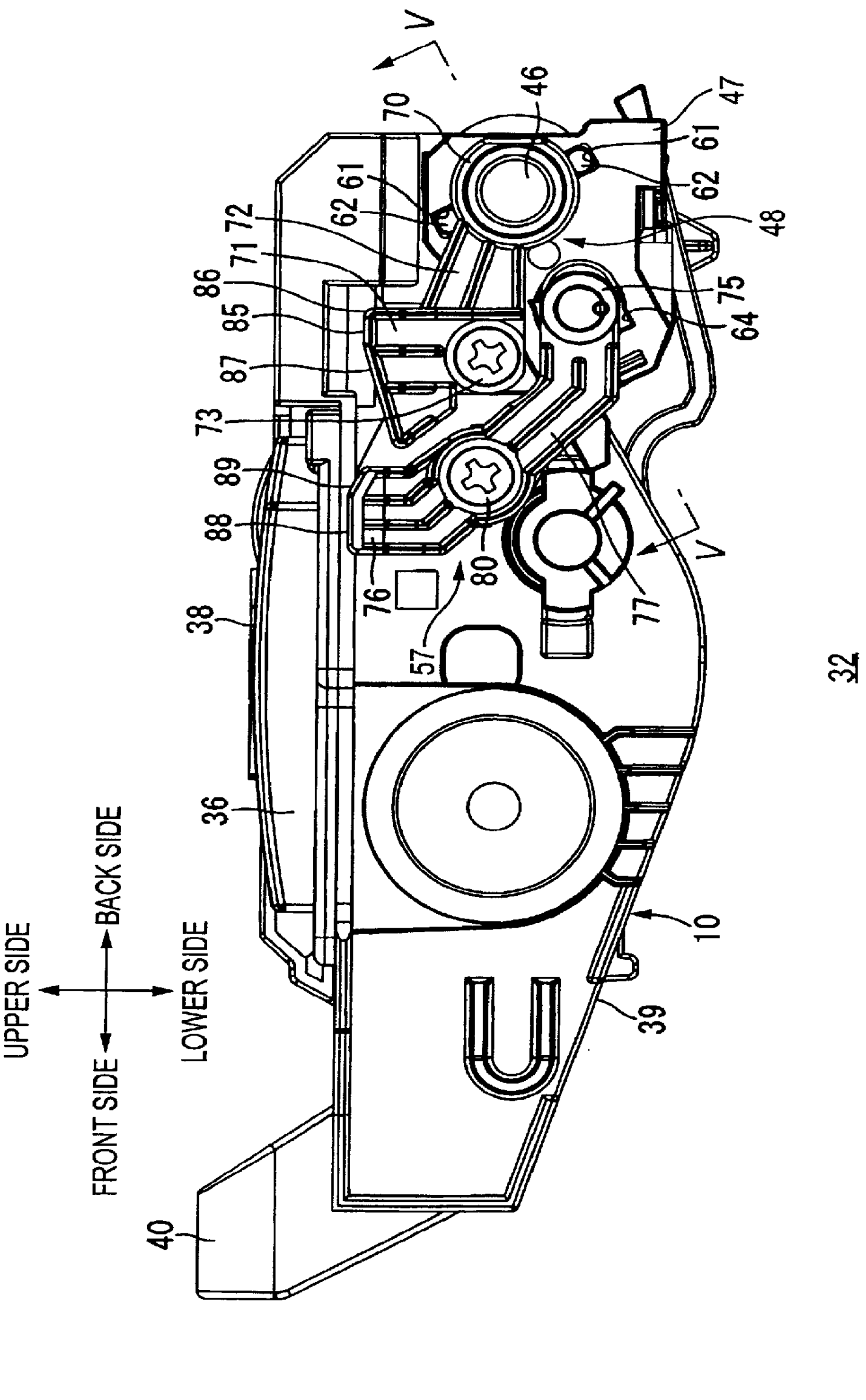
FIG. 4 is a right side sectional view of the developing cartridge according to the first exemplary embodiment.
Figure 6:
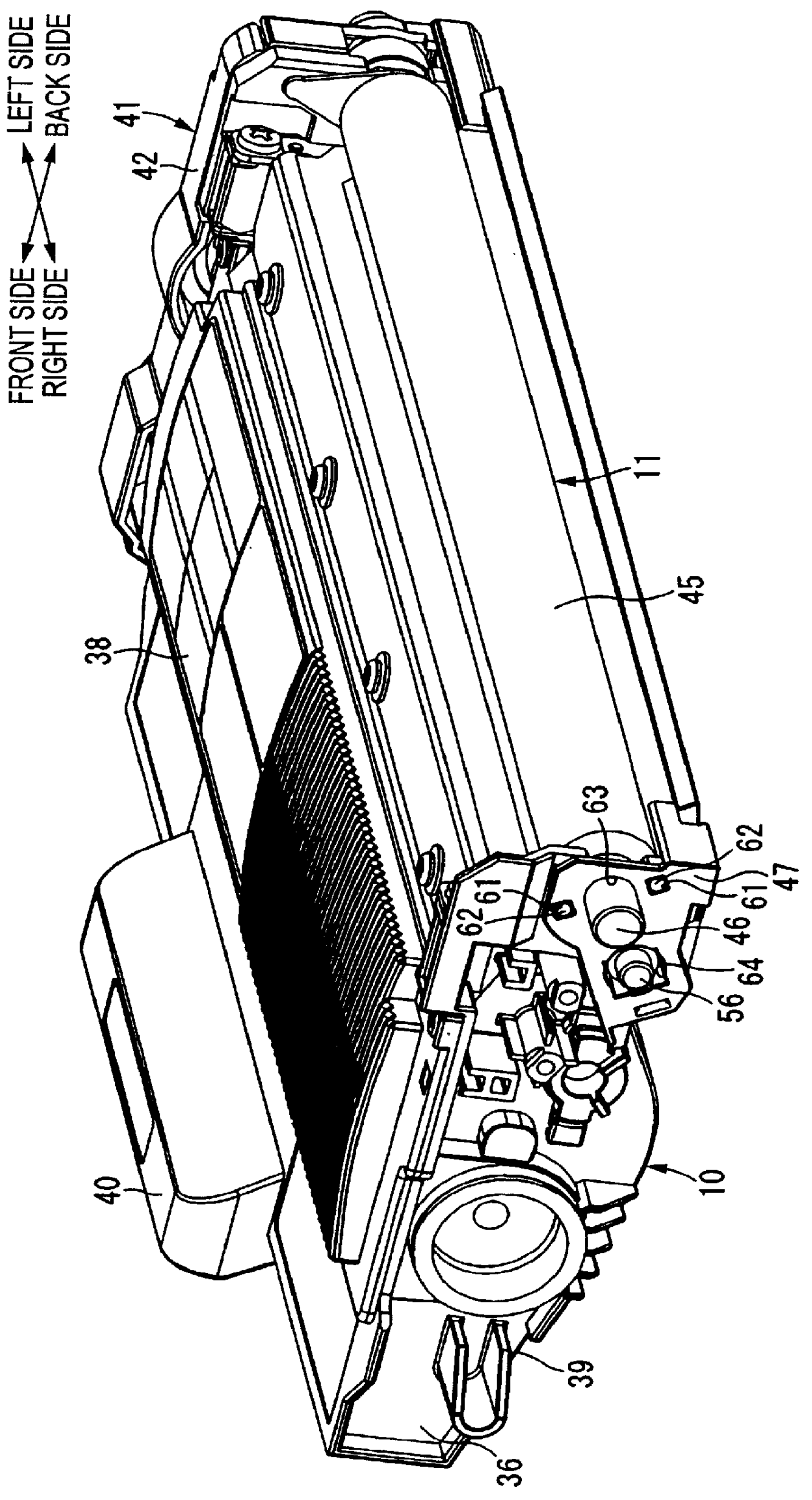
FIG. 6 is a perspective view of the developing cartridge according to the first exemplary embodiment, which shows a state in which a developing electrode and a supply electrode are removed.

As shown in FIGS. 2, 4 and 6, a right bearing member 47 (one example of a bearing member) is provided at an outer side of the right sidewall 36. The right end portions of developing roller shaft 46 and the supply roller shaft 56 are supported by the right sidewall 36 via the right bearing member 47 so that they can be relatively rotated. In other words, the right bearing member 47 collectively holds the right end portion of the developing roller shaft 46 and the right end portion of the supply roller shaft 56.

As shown in FIG. 6, the right bearing member 47 has a substantially triangle shape, when seen from the side face.

The right bearing member 47 is formed with a first shaft insertion penetration hole 63 at a position opposite to the developing roller shaft 46 in the left-right direction. The first shaft insertion penetration hole 63 has an inner diameter that is substantially the same as an outer diameter of the developing roller shaft 46. The right end portion of the developing roller shaft 46 is inserted into the first shaft insertion penetration hole 63, and a leading end of the developing roller shaft 46 protrudes further protruded than the right bearing member 47 in the outer (right) direction.

In addition, the right bearing member 47 is formed with two boss insertion penetration holes 61. The boss insertion penetration holes 61 are formed at front-upper and back-lower positions from the first shaft insertion penetration hole 63, respectively. The right sidewall 36 is formed with two protruding bosses 62 at positions corresponding to the boss insertion penetration holes 61. The two bosses 62 of the right sidewall 36 are inserted into the respective boss insertion penetration holes 61 of the right bearing member 47, so that the right bearing member 47 is mounted to the right sidewall 36 with being positioned relative to the right sidewall 36.

In addition, the right bearing member 47 is formed with a second shaft insertion penetration hole 64 at a position opposite to the supply roller shaft 56 in the left-right direction. The second shaft insertion penetration hole 64 has a substantially angular shaped hole having a size greater than an outer diameter of the supply roller shaft 56. A front side part of the second shaft insertion penetration hole 64 is bent in such a way that it protrudes in a diametrically outer direction of the supply roller shaft 56. The right end portion of the supply roller shaft 56 is inserted into the second shaft insertion penetration hole 64, and a leading end of the supply roller shaft 56 protrudes further protruded than the right bearing member 47 in the outer (right) direction. A gap is formed between an inner surface of the second shaft insertion penetration hole 64 and the supply roller shaft 56.

As shown in FIG. 5, left bearing members 49, 58 are provided at an outer side of the left sidewall 36.

A left end portion of the developing roller shaft 46 is supported by the left sidewall 36 via the left bearing member 49 so that the left end portion of the developing roller shaft 46 can be relatively rotated.

A left end portion of the supply roller shaft 56 is supported by the left sidewall 36 via the left bearing member 58 so that the left end portion of the supply roller shaft 56 can be relatively rotated.

(2-4) Gear Unit

As shown in FIG. 3, a gear cover 42 is mounted to the left end portion of the developing cartridge.

As shown in FIG. 5, the left end portion of the developing roller shaft 46 is protrudes leftward from the gear cover 42, and a cylindrical collar member 41 is attached to the protruding portion. In addition, the left end portion of the supply roller shaft 56 is arranged between the gear cover 42 and the left sidewall 36.

A developing roller gear 50 is attached to the developing roller shaft 46 between the gear cover 42 and the left sidewall 36 so that the developing roller gear 50 cannot be relatively rotated. A driving force for driving the developing roller 11 is input to the developing roller gear 50 with the developing cartridge 32 (process cartridge 3) being mounted in the body casing 2.

A supply roller gear 59 is attached to the supply roller shaft 56 between the gear cover 42 and the left sidewall 36 so that the supply roller gear 59 cannot be relatively rotated. A driving force for driving the supply roller 37 is input to the supply roller gear 59 with the developing cartridge 32 (process cartridge 3) being mounted in the body casing 2.

(3) Structure for Feeding Power to Developing Roller and Supply Roller

As shown in FIG. 4, a developing electrode 48 and a supply electrode 57 are provided at an outer side of the right sidewall 36.

(3-1) Developing Electrode

The developing electrode 48 is made of a conductive resin. As shown in FIG. 4, the developing electrode 48 integrally includes a developing connection part 70, a developing protrusion 71 and a developing coupling part 72.

The developing connection part 70 has a cylindrical shape. As shown in FIG. 5, a protruded portion of the developing roller shaft 46, which protrudes rightward from the right bearing member 47, is inserted in the developing connection part 70. Thereby, the developing electrode 48 contacts the circumferential surface of the developing roller shaft 46, so that the developing electrode 48 and the developing roller shaft 46 are electrically connected.

As shown in FIG. 4, the developing protrusion 71 has a plate shape that protrudes further than the developing connection part 70 in the left direction at the back-upper position with respect to the developing connection part 70.

Specifically, a parallel surface 85, a first inclined surface 86 and a second inclined surface 87 (examples of inclined surfaces) are formed on an upper surface of the developing protrusion 71. The parallel surface 85 extends in the front-back direction. The first inclined surface 86 continues from a back end portion of the parallel surface 85. The second inclined surface 87 continues from a front end portion of the parallel surface 85.

The parallel surface 85 extends in the front-back direction at a position above the developing roller shaft 46, when seen from a side face.

The first inclined surface 86 continues toward the back end portion of the parallel surface 85 and forms a bent surface that is gently bent and downward extended.

The second inclined surface 87 continues toward the front end portion of the parallel surface 85 and forms a plane that is extended with a constant gradient in the front-lower direction.

In addition, as indicated by the dotted line in FIG. 3, a developing-side contact position 91 (one example of a contact position), to which a developing contact point member 90 (which will be described later) contacts when the developing cartridge 32 is mounted in the body casing 2, is set to the parallel surface 85.

As shown in FIG. 4, the developing coupling part 72 has a plate shape extending in the substantially front-back direction and couples the developing connection part 70 and the developing protrusion 71. In addition, the developing coupling part 72 is formed with a screw hole (not shown). A screw 73 is engaged with the right sidewall 36 through the screw hole, so that the developing electrode 48 is fixed to the developing housing 10 of the developing cartridge 32.

When the process cartridge 3, in which the developing cartridge 32 is mounted to the drum cartridge 31, is mounted in the body casing 2, a main body-side developing electrode (not shown) provided in the body casing 2 connects to the developing protrusion 71. When a developing bias is input to the developing protrusion 71 from the main body-side developing electrode, the developing bias is applied to the developing roller shaft 46 through the developing coupling part 72 and the developing connection part 70.

(3-2) Supply Electrode

The supply electrode 57 is made of conductive resin. As shown in FIG. 4, the supply electrode 57 integrally includes a supply connection part 75, a supply protrusion 76 and a supply coupling part 77.

The supply connection part 75 has a substantially cylindrical shape having a sealed right end. The supply connection part 75 is fitted to a gap between a protruded portion of the supply roller shaft 56, which protrudes rightward from the right bearing member 47, and the second shaft insertion penetration hole 64 formed at the right bearing member 47. Thereby, the right end portion of the supply roller shaft 56 is inserted into the cylindrical supply connection part 75, and the supply electrode 57 is fixed to the right bearing member 47. Thus, the supply electrode 57 contacts the circumferential surface of the supply roller shaft 56, so that the supply electrode 57 and the supply roller shaft 56 are electrically connected.

The supply protrusion 76 has a plate shape that protrudes further than the supply connection part 75 in the left direction at the back-upper position from the supply connection part 75. In addition, the supply protrusion 76 is arranged at the front of the developing protrusion 71 of the developing electrode 48. In other words, the developing protrusion 71 and the supply protrusion 76 are arranged in the front-back direction.

Specifically, an upper surface of the supply protrusion 76 includes a parallel surface 88 extending in the front-back direction and a third inclined surface 89 (one example of an inclined surface) continuing to a back end portion of the parallel surface 88.

The parallel surface 88 is extended in the front-back direction at a position slightly above the parallel surface 85 formed at the developing protrusion 71, when seen from the side face.

The third inclined surface 89 is continued from the back end portion of the parallel surface 88 and forms a plane that extends with a constant gradient in the back-lower direction.

In addition, as indicated by the dotted line in FIG. 3, a supply-side contact position 93 (one example of a contact position) to which a supply contact point member 92 (which will be described later) is contacted when the developing cartridge 32 is mounted in the body casing 2, is set to the parallel surface 88. The supply-side contact position 93 is provided at a position further left than the developing-side contact position 91. In other words, the developing-side contact position 91 and the supply-side contact position 93 are not aligned in the axis direction (left-right direction) of the developing roller 11.

As shown in FIG. 4, the supply coupling part 77 has a plate shape extending from the back-lower side to the front-upper side and couples the supply connection part 75 and the supply protrusion 76. A screw hole (not shown) is formed in the supply coupling part 77. A screw 80 is engaged with the right sidewall 36 through the screw hole, so that the supply electrode 57 is fixed to the developing housing 10 of the developing cartridge 32.

When the process cartridge 3, in which the developing cartridge 32 is mounted to the drum cartridge 31, is mounted in the body casing 2, a main body-side supply electrode (not shown) provided in the body casing 2 is connected to the supply protrusion 76. When a supply bias is input to the supply protrusion 76 from the main body-side supply electrode, the supply bias is applied to the supply roller shaft 56 through the supply coupling part 77 and a contact part 79 of the supply connection part 75.

(4) Structure in Body Casing

In FIGS. 7A to 7E, the drum cartridge 31 and the body casing 2 are not shown so as more easily understand the drawings.

A developing contact point member 90 and a supply contact point member 92 are formed in the body casing 2 (refer to FIG. 1).

The developing contact point member 90 is formed by bending a metal wire, for example, and integrally includes an engage part 95 and an elastic part 96.

The engage part 95 is formed by winding the wire into a vortex spring shape many times. A protrusion (not shown) provided in the body casing 2 is inserted into a center of the vortex of the engage part 95, so that the developing contact point member 90 is engaged in the body casing 2.

The elastic part 96 extends in the back-lower direction from the engage part 95. The elastic part 96 is bent at a center portion thereof and extends in the back-upper direction, so that the elastic part has a V shape when seen from the side face. A peak portion (bent portion) 96A of the elastic part 96 is slightly circular and is gently bent.

A back end portion of the elastic part 96 is further bent and is then extended backward.

The supply contact point member 92 is arranged at the front of the developing contact point member 90 and has the substantially same shape as the developing contact point member 90. In other words, the supply contact point member 92 integrally includes an engage part 97 having a vortex spring shape and an elastic part 98 having a substantially V shape when seen from a side face. A peak portion (bent portion) 98A of the elastic part 98 is slightly circular and is gently bent.

(5) Operation of Attaching and Detaching Process Cartridge to and from Body Casing As shown in FIG. 1, in the printer 1, the process cartridge 3, in which the developing cartridge 32 is mounted to the drum cartridge 31, is detachably mounted to the body casing 2.

Incidentally, since the drum cartridge 31 is not shown in FIGS. 7A to 7E, an operation of attaching and detaching the process cartridge 3 to and from the body casing 2 will be described using the developing cartridge 32.

(5-1) Operation of Mounting Process Cartridge to Body Casing

When mounting the process cartridge 3 to the body casing 2, the front cover 4 shown in FIG. 1 is first opened. Then, the developing cartridge 3 is moved backward through an opening formed at the front side of the body casing 2. At this time, the photosensitive drum 6 of the process cartridge 3 is arranged at a downstream side (back side) of a mounting direction of the developing unit 3 to the body casing 2.

Figure 7A:
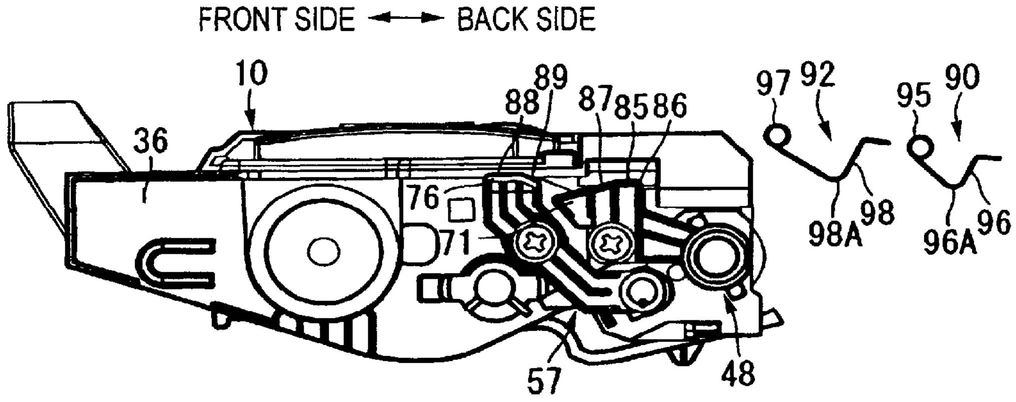
FIG. 7A is a right side sectional view showing a state in which a process cartridge including the developing cartridge according to the first exemplary embodiment is being mounted to a body casing of the printer.

During the mounting of the process cartridge 3, as shown in FIG. 7A, the developing contact point member 90 and the supply contact point member 92 are opposed to the process cartridge 3 from the back side.

Figure 7B:
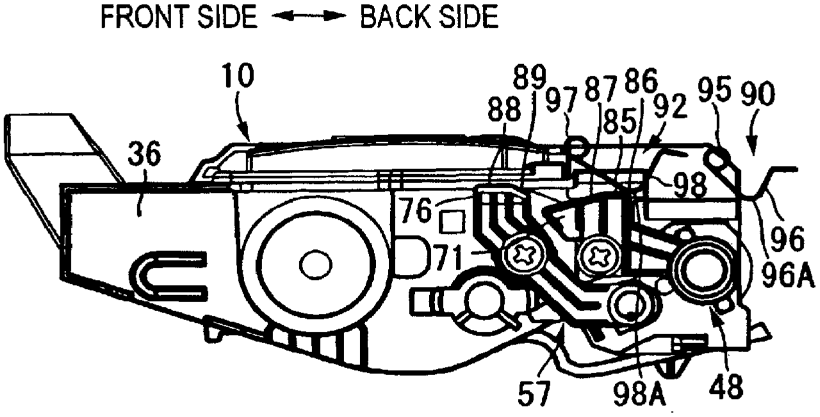
FIG. 7B is a right side sectional view of the process cartridge showing a next state of FIG. 7A.

When the process cartridge 3 is moved further backward, the elastic part 98 of the supply contact point member 92 contacts the developing protrusion 71 of the developing electrode 48 from the back side, as shown in FIG. 7B. Specifically, the peak portion 98A of the elastic part 98 contacts the first inclined surface 86 of the developing protrusion 71. Then, the elastic part 98 of the supply contact point member 92 is put on the first inclined surface 86 while being deformed at the engage part 97, which serves as a support point, and is then guided toward the parallel surface 85.

Figure 7C:
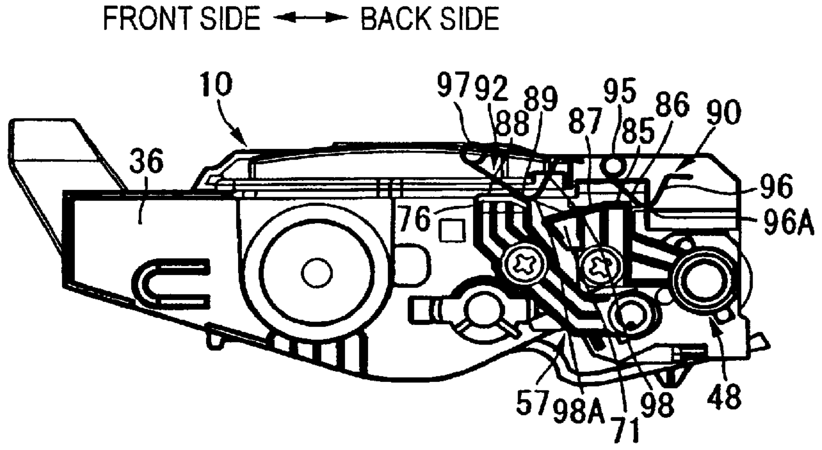
FIG. 7C is another right side sectional view of the process cartridge showing a next state of FIG. 7B.

After that, when the process cartridge 3 is moved backward, the elastic part 98 of the supply contact point member 92 moves away from the parallel surface 85. Then, as shown in FIG. 7C, the elastic part 98 of the supply contact point member 92 contacts the supply protrusion 76 of the supply electrode 57 from the back side thereof. Specifically, the peak portion 98A of the elastic part 98 contacts the third inclined surface 89 of the supply protrusion 76. Then, the elastic part 98 of the supply contact point member 92 is put on the third inclined surface 86 while being deformed at the engage part 97, which serves as a support point, and is then guided toward the parallel surface 88.

When the process cartridge 3 is further moved backward, the peak portion 98A of the elastic part 98 of the supply contact point member 92 is put on the parallel surface 88 of the supply protrusion 76. At this time, the peak portion 98A contacts the supply-side contact position 93 indicated by the dotted line in FIG. 3. In addition, the peak portion 96A of the elastic part 96 of the developing contact point member 90 contacts the first inclined surface 86 of the developing protrusion 71 from the back side thereof and the elastic part 96 is put on the first inclined surface 86 while being deformed at the engage part 95, which serves as a support point. Then, the peak portion 96A of the elastic part 96 is guided along the first inclined surface 86, so that the peak portion 96A is put on the parallel surface 85. At this time, the peak portion 96A contacts the developing-side contact position 91 indicated by the dotted line in FIG. 3. Thereby, the mounting of the process cartridge 3 to the body casing 2 is completed.

(5-2) Operation of Detaching Process Cartridge from Body Casing

The detachment of the process cartridge 3 from the body casing 2 is made by pulling out the process cartridge 3 toward the front.

Figure 7D:
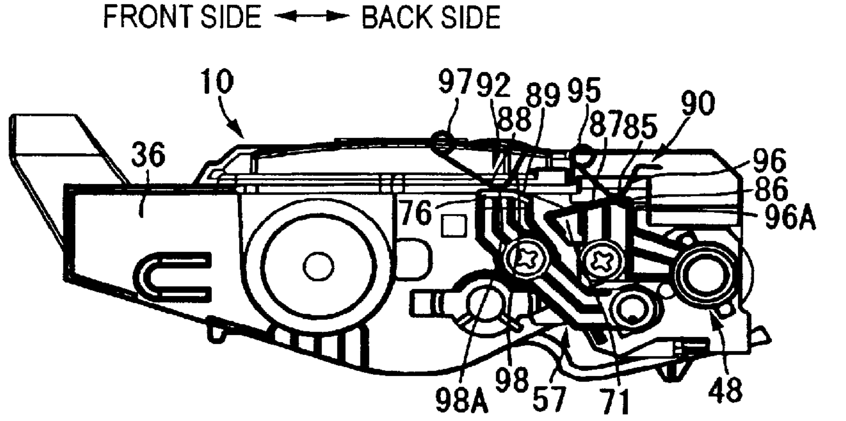
FIG. 7D is still another right side sectional view showing a state in which the process cartridge has been mounted to the body casing.

Specifically, when the process cartridge 3 is retreated forward from the state shown in FIG. 7D, the peak portion 96A of the developing contact point member 90 is moved backward on the parallel surface 85 of the developing protrusion 71 and is guided along the first inclined surface 86. Then, the peak portion 96A is spaced from the developing electrode 48. Further, the peak portion 98A of the supply contact point member 92 is moved backward on the parallel surface 88 of the supply protrusion 76 and is guided along the third inclined surface 89. Then, the peak portion 98A is spaced from the supply electrode 57.

Figure 7E:
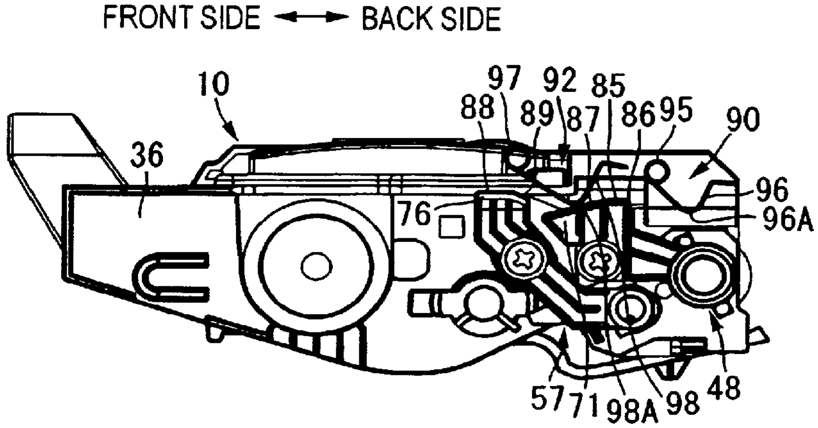
FIG. 7E is still another right side sectional view showing a state in which the process cartridge is being detached from the body casing.

After that, when the process cartridge 3 is further moved forward, the peak portion 98A of the supply contact point member 92 contacts the second inclined surface 87 of the developing protrusion 71 from the front side thereof, as shown in FIG. 7E.

Then, as the process cartridge 3 is moved forward, the peak portion 98A is moved backward on the second inclined surface 87 while the elastic part 98 is elastically deformed at the engage part 97, which serves as a support point. After being put on the parallel surface 85, the peak portion 98A is moved backward on the parallel surface 85 and is guided along the first inclined surface 86. Then, the peak portion 98A is spaced from the developing electrode 48. Thereby, the supply contact point member 92 is spaced from the developing electrode 48.

After that, when the process cartridge 3 is pulled out from the body casing 2, the detachment of the process cartridge 3 from the body casing 2 is completed.

As described above, the developing chamber 33 and the toner accommodating chamber 34 are formed adjacent to each other in the developing housing 10 of the developing cartridge 32. The toner is accommodated in the toner accommodating chamber 34 and is supplied to the developing chamber 33. The developing roller 11 and the supply roller 37 are provided to the developing chamber 33. The developing roller 11 includes the developing roller shaft 46 extending in the facing direction of both sidewalls of the developing housing 10. In addition, the supply roller 37 includes the supply roller shaft 56 extending in the facing direction of both sidewalls of the developing housing 10. In other words, the developing roller shaft 46 extends in the direction orthogonal to opposing sidewalls of the developing housing 10, and the supply roller shaft 56 extends in the direction orthogonal to opposing sidewalls of the developing housing 10. The developing electrode 48 and the supply electrode 57 are provided at the outer side of the right sidewall 36 of the developing housing 10. Further, the developing electrode 48 is electrically connected to the developing roller shaft 46, and the supply electrode 57 is electrically connected to the supply roller shaft 56. The developing protrusion 71 of the developing electrode 48 protrudes in a direction parallel to the developing roller shaft 46 at a position different from the developing roller shaft 46, when seen from the side face. In addition, the supply protrusion 76 of the supply electrode 57 protrudes in a direction parallel to the supply roller 37 (supply roller shaft 56) at a position different from the supply roller shaft 56, when seen from the side face. The developing protrusion 71 and the supply protrusion 76 are arranged in the arrangement direction (front-back direction) of the developing chamber 33 and the toner accommodating chamber 34.

Since the developing protrusion 71 is arranged at the position different from the developing roller shaft 46 and the supply protrusion 76 is arranged at the position different from the supply roller shaft 56, it is possible to freely arrange the developing protrusion 71 and the supply protrusion 76, irrespective of the arrangement of the developing roller shaft 46 and the supply roller shaft 56. Accordingly, it is possible to increase a degree of freedom of layouts of the developing protrusion 71 and the supply protrusion 76.

The developing protrusion 71 and the supply protrusion 76 are arranged in the arrangement direction (front-back direction) of the developing chamber 33 and the toner accommodating chamber 34. Accordingly, even when a size in the thickness direction (upper-lower direction) of the developing cartridge 32 orthogonal to the arrangement direction is small, it is possible to arrange the developing protrusion 71 and the supply protrusion 76. In other words, it is possible to make the developing cartridge 32 thin by arranging the developing protrusion 71 and the supply protrusion 76 in the arrangement direction.

In addition, in order to feed power to the developing electrode 48 through the developing protrusion 71, the body casing 2 is provided with the developing contact point member 90, which is electrically connected to the developing protrusion 71. The developing protrusion 71 protrudes in the direction parallel to the developing roller shaft 46. Accordingly, when connecting the developing contact point member 90 to the developing protrusion 71, the developing contact point member 90 does not scrape the sidewall 36 of the developing cartridge 32. Hence, it is possible to prevent the sidewall 36 of the developing cartridge 32 and the developing contact point member 90 from being worn.

Furthermore, in order to feed power to the supply electrode 57 through the supply protrusion 76, the body casing 2 is provided with the supply contact point member 92, which is electrically connected to the supply protrusion 76. The supply protrusion 76 protrudes in the direction parallel to the supply roller shaft 56. Accordingly, when connecting the supply contact point member 92 to the supply protrusion 76, the supply contact point member 92 does not scrape the sidewall 36 of the developing cartridge 32. Hence, it is possible to prevent the sidewall 36 of the developing cartridge 32 and the supply contact point member 92 from being worn.

In addition, the right bearing member 47 is attached to the right sidewall 36. The developing roller shaft 46 and the supply roller shaft 56 are rotatably held by the right bearing member 47. Thereby, the developing roller 11 is supported through the developing roller shaft 46 and the supply roller 37 is supported through the supply roller shaft 56 with one right bearing member 47. Accordingly, it is possible to improve the relative positioning precision of the developing roller 11 and the supply roller 37.

Additionally, the developing electrode 48 contacts the circumferential surface of the developing roller shaft 46. Thereby, even when the developing roller shaft 46 is rotated, it is possible to always contact the developing electrode 48 to the circumferential surface of the developing roller shaft 46. Accordingly, it is possible to stably feed the power from the developing electrode 48 to the developing roller shaft 46.

In addition, the supply electrode 57 contacts the circumferential surface of the supply roller shaft 56. Thereby, even when the supply roller shaft 56 is rotated, it is possible to always contact the supply electrode 57 to the circumferential surface of the supply roller shaft 56. Accordingly, it is possible to stably feed the power to the supply roller shaft 56 from the supply electrode 57.

Further, the developing contact point member 90 contacts the developing protrusion 71 with the developing cartridge 32 being mounted to the body casing 2. In addition, the supply contact point member 92 contacts the supply protrusion 76 with the developing cartridge 32 being mounted to the body casing 2. The contact position (developing-side contact position 91) between the developing contact point member 90 and the developing protrusion 71 is offset from the contact position (supply-side contact position 93) between the developing contact point member 92 and the supply protrusion 76 are in the left-right direction.

Thereby, with the developing cartridge 32 being mounted to the body casing 2, it is possible to supply the developing bias to the developing electrode 48 from the developing contact point member 90 through the developing protrusion 71 and to supply the supply bias to the supply electrode 57 from the supply contact point member 92 through the supply protrusion 76.

In addition, since the developing cartridge 32 is attached and detached to and from the body casing 2 along the front-back direction, the supply contact point member 92, which is connected to the supply protrusion 76, scrapes the developing protrusion 71 that is arranged at the downstream side (back side) of the mounting direction. Thus, the developing protrusion 71 is worn due to the scraping against the supply contact point member 92. However, since the developing-side contact position 91 and the supply-side contact position 93 are not aligned in the left-right direction, it is possible to prevent the developing-side contact position 91 from being worn.

In addition, the developing contact point member 90 contacts the developing protrusion 71 from the back side. The developing protrusion 71 includes the first inclined surface 86 at the back side of the developing protrusion from the parallel surface 85. Therefore, it is possible to favorably guide the developing contact point member 90 to the parallel surface 85 by the first inclined surface 86.

Additionally, since the developing protrusion 71 is arranged further toward the back side than the supply protrusion 76, the supply contact point member 92 contacts the developing protrusion 71 from the front side when the developing cartridge 32 is detached from the body casing 2. The developing protrusion 71 includes the second inclined surface 87 at the front side regarding the parallel surface 85. Therefore, it is possible to guide the supply contact point member 92 to the back side by the second inclined surface 87.

Further, since the supply protrusion 76 is arranged further toward the front side than the developing protrusion 71, the supply contact point member 92 contacts the supply protrusion 76 from the developing protrusion 71 side (back side). The supply protrusion 76 includes the third inclined surface 89 at the developing protrusion 76 side from the parallel surface 88. Therefore, it is possible to favorably guide the supply contact point member 92 to the parallel surface 88 by the third inclined surface 89.

(6) Modified Exemplary Embodiment

An exemplary embodiment of the invention has been described above. However, the invention can be implemented according to other exemplary embodiments.

For example, in the above-described exemplary embodiment, a white-black printer has been described as an example of the image forming apparatus. However, a color printer may be adopted as an example of the image forming apparatus. In this case, the invention can be applied to a developing cartridge that is detachably mounted to the color printer.

What is claimed is:

1. A cartridge comprising:

a housing configured to accommodate developer therein;

a developing roller rotatable about a first axis extending in a first direction;

a supply roller rotatable about a second axis extending in the first direction, the supply roller including a supply roller shaft extending in the first direction; and a supply electrode electrically connected to the supply roller shaft, the supply electrode being positioned at a first outer surface of the housing in the first direction, the supply electrode not electrically connected to the developing roller.

2. The cartridge according to claim 1, further comprising:

a screw fixing the supply electrode to the housing, wherein the supply electrode has a screw hole through which the screw is inserted.

3. The cartridge according to claim 1, further comprising:

a gear cover being positioned at a second outer surface of the housing in the first direction, the second outer surface space apart from the first outer surface in the first direction;

a developing roller gear attached to a developing roller shaft of the developing roller, the developing roller gear being positioned between the second outer surface and the gear cover in the first direction; and a supply roller gear attached to the supply roller shaft, the supply roller gear being positioned between the second outer surface and the gear cover in the first direction.

4. The cartridge according to claim 1, wherein the supply electrode is made of conductive resin.

5. The cartridge according to claim 1, wherein the supply electrode contacts a circumferential surface of the supply roller shaft.

6. The cartridge according to claim 1, wherein a part of the supply electrode is away from the developing roller in a second direction crossing the first direction.

7. The cartridge according to claim 1, wherein the supply electrode includes a protrusion extending in the first direction.

8. The cartridge according to claim 1, wherein the supply roller shaft is inserted into the supply electrode.

9. The cartridge according to claim 1, wherein the supply electrode is contactable with an apparatus electrode of an image forming apparatus.

10. The cartridge according to claim 1, further comprising:

a bearing into which the supply roller shaft is inserted, the bearing being positioned at the first outer surface of the housing, wherein the supply electrode is attached to the bearing.

11. The cartridge according to claim 1, wherein the supply electrode includes:

a supply connection part electrically connected to the supply roller shaft; and a supply protrusion protruding in the first direction, the supply protrusion spaced apart from the supply connection part.

12. The cartridge according to claim 11, wherein the supply protrusion is positioned further away from the first outer surface of the housing than the supply connection part from the first outer surface of the housing in the first direction.

13. The cartridge according to claim 11, wherein the supply electrode further includes:

a supply coupling part coupling the supply connection part and the supply protrusion.

14. The cartridge according to claim 12, wherein the supply electrode further includes:

a supply coupling part coupling the supply connection part and the supply protrusion.

15. The cartridge according to claim 13, wherein the supply coupling part has a plate shape.

16. The cartridge according to claim 14, wherein the supply coupling part has a plate shape.

17. The cartridge according to claim 11, wherein the supply protrusion includes a surface extending in a second direction crossing the first direction.

18. The cartridge according to claim 17, wherein the surface of the supply protrusion is contactable with an apparatus electrode of an image forming apparatus.

19. The cartridge according to claim 11, wherein the supply protrusion is spaced apart from the supply roller shaft in a second direction crossing the the first direction.

* * * * *